US012446899B2

(12) United States Patent
Karas

(10) Patent No.: US 12,446,899 B2
(45) Date of Patent: Oct. 21, 2025

(54) DEVICE, METHOD, AND KIT FOR PREPARING A BONE VOID FOR JOINT REPLACEMENT

(71) Applicant: KARAS GROUP LLC, Chicago, IL (US)

(72) Inventor: Vasili Karas, Chicago, IL (US)

(73) Assignee: KARAS GROUP LLC, Chicago, IL (US)

( * ) Notice: Subject to any disclaimer, the term of this patent is extended or adjusted under 35 U.S.C. 154(b) by 169 days.

(21) Appl. No.: 18/557,864

(22) PCT Filed: Apr. 5, 2022

(86) PCT No.: PCT/US2022/023510
§ 371 (c)(1),
(2) Date: Oct. 27, 2023

(87) PCT Pub. No.: WO2022/235365
PCT Pub. Date: Nov. 10, 2022

(65) Prior Publication Data
US 2024/0206888 A1    Jun. 27, 2024

Related U.S. Application Data

(60) Provisional application No. 63/184,451, filed on May 5, 2021.

(51) Int. Cl.
*A61B 17/16* (2006.01)
*A61F 2/46* (2006.01)

(52) U.S. Cl.
CPC ........ *A61B 17/164* (2013.01); *A61B 17/1631* (2013.01); *A61B 17/1659* (2013.01); *A61F 2/4607* (2013.01); *A61B 2017/1602* (2013.01)

(58) Field of Classification Search
CPC .............. A61B 17/164; A61B 17/1631; A61B 17/1642
See application file for complete search history.

(56) References Cited

U.S. PATENT DOCUMENTS 4,466,429 A * 8/1984 Loscher ............. A61B 17/1659
606/85
5,387,218 A    2/1995 Meswania
(Continued)

FOREIGN PATENT DOCUMENTS

JP       2024516727      4/2024
WO   WO 2022/235365 A1  11/2022

OTHER PUBLICATIONS

International Search Report and Written Opinion for International Application No. PCT/US2022/023510, Notification mailed Aug. 17, 2022.

(Continued)

*Primary Examiner* — Andrew Yang
(74) *Attorney, Agent, or Firm* — Knobbe Martens Olson & Bear LLP

(57) ABSTRACT

Systems and methods for use of an instrument for preparing a bone for joint replacement is provided. In various embodiments, the instrument comprises a tool frame, a drive interface, a drive shaft, at least one torque interface, and a plurality of bone sculpting tools interlocked to form at least one continuous loop. Methods and systems for preparing a femur for total hip arthroplasty are also provided.

20 Claims, 8 Drawing Sheets

(56) References Cited

U.S. PATENT DOCUMENTS

| | | | |
|---|---|---|---|
| 6,482,209 | B1 | 11/2002 | Engh et al. |
| 7,090,677 | B2 * | 8/2006 | Fallin ................... A61B 17/175 |
| | | | 606/80 |
| 7,985,225 | B2 | 7/2011 | Johnson et al. |
| 8,002,776 | B2 * | 8/2011 | Liu ................... A61B 17/1757 |
| | | | 606/85 |
| 9,597,091 | B2 | 3/2017 | Bromer |
| 10,292,719 | B2 | 5/2019 | Burger et al. |
| 2003/0187449 | A1 | 10/2003 | McCleary et al. |
| 2008/0033443 | A1 | 2/2008 | Sikora et al. |
| 2008/0275448 | A1 | 11/2008 | Sackett et al. |

OTHER PUBLICATIONS

Search Report received in European Patent Application No. 22799266.6, May 26, 2025, 10 pages.

* cited by examiner

DEVICE, METHOD, AND KIT FOR PREPARING A BONE VOID FOR JOINT REPLACEMENT

INCORPORATION BY REFERENCE TO ANY PRIORITY APPLICATIONS

This application claims priority from U.S. Provisional Patent Application 63/184,451 filed May 21, 2021, and entitled DEVICE, METHOD, AND KIT FOR PREPARING A BONE VOID FOR JOINT REPLACEMENT, which is hereby incorporated by reference in its entirety, herein.

BACKGROUND

Field of the Invention

Embodiments of the present invention relate to instruments, methods, and kits for replacing a joint. More specifically, the present invention relates to instruments, methods, and kits for preparing for preparing a bone void, for example, in a patient's femur during hip arthroplasty.

Description of the Related Art

Total knee and total hip arthroplasty are durable and reliable treatments for end-stage degenerative joint disease and are two of the most frequently performed orthopedic surgery procedures around the world annually. Joint arthroplasty is used to treat painful, arthritic joints through the resection of diseased bone surfaces and resurfacing of the joint with a prosthetic bearing surface. In addition to resecting painful joint surfaces, joint replacement surgery involves preparation of bony surfaces for the successful implantation of prosthetic components designed to depend on either bone cement or on bony ingrowth for durable prosthetic fixation. For both cementless and cemented prosthetic implants, a void is created in the patient's bone that approximates the shape of the implant.

An improved method for bone preparation in joint arthroplasty generates low peak stress to reduce the rate of intraoperative fracture, can be performed using any anatomic approach to the joint including popular minimally-invasive approaches, and creates a bone void that resembles the shape of most commonly implanted prosthetic joint replacements.

SUMMARY

As used herein, the term "aspect" may be used interchangeably with the term "embodiment." Any feature, structure, or step disclosed among the embodiments herein can be replaced with or combined with any other feature, structure, or step disclosed herein, or omitted. Further, for purposes of summarizing the disclosure, certain aspects, advantages, and features of the inventions have been described herein. It is to be understood that not necessarily any or all such advantages are achieved in accordance with any particular embodiment of the inventions disclosed herein. No individual aspects of this disclosure are essential or indispensable.

In accordance with various aspects of the present invention, a bone void sculpting instrument for preparing a bone for joint replacement, for example, a method for preparing a femur for total hip arthroplasty, and a system for preparing a femur for total hip arthroplasty are provided. Various embodiments of the instrument, methods, and systems disclosed within offer the advantages of sculpting a bone void in an irregular shape to closely match the size and shape of an intended prosthetic implant. The instruments, systems, and methods allow the sculpting of the bone void having an irregular cross-section using a minimally invasive approach not providing collinear access to the bone being sculpted, providing a continuous non-circular cutting surface that does not impose large mechanical stresses on the bone being sculpted. Further, the instruments, methods, and systems disclosed herein can be used to remove bone and expand or shape a bone cavity, or to compress the soft bone in the cavity, better preparing the bone cavity for the shape of the final implant by improving the match between the prosthetic implant and the bone cavity, as well as improving the mechanical properties of the bone, such as the density, resulting in better clinical outcomes when the implant is installed.

In various embodiments, a bone void sculpting instrument for preparing a bone for joint replacement includes a tool frame, which includes a primary lateral surface; at least one secondary lateral surface recessed from the primary lateral surface, wherein the at least one secondary lateral surface has a non-constant radius; and an internal tool frame cavity; a driveshaft having a proximal end and a distal end, wherein the driveshaft is rotatably fixed within the internal tool frame cavity; a drive interface coupled to the proximal end of the driveshaft; a plurality of interlocked bone sculpting tools configured to form at least one continuous loop around the at least one secondary lateral surface, the at least one continuous loop of the plurality of interlocked bone sculpting tools having a substantially same cross-sectional shape as the at least one secondary lateral surface, the at least one continuous loop of the plurality of interlocked bone sculpting tools configured to move along a pre-configured path along the at least one secondary lateral surface; and at least one torque interface coupled to both the driveshaft and the at least one continuous loop of the plurality of interlocked bone sculpting tools.

In one embodiment, the bone void sculpting instrument includes a plurality of secondary lateral surfaces; a plurality of continuous loops of interlocked bone sculpting tools; and a plurality of torque interfaces, wherein each continuous loop of interlocked bone sculpting tools is matched with a corresponding secondary lateral surface and torque interface. In one embodiment, the bone void sculpting instrument has no more than fifty secondary lateral surfaces, no more than fifty continuous loops of interlocked bone sculpting tools, and no more than fifty torque interfaces. In one embodiment, a body is formed from a plurality of segments each includes a primary lateral surface; a secondary lateral surface; and an internal tool frame cavity, wherein the plurality of segments are rigidly connected to one another. In one embodiment, the drive interface is configured to receive torque in a first direction of rotation and transfer to the torque to the driveshaft in either the first direction of rotation or a second direction of rotation. In one embodiment, the driveshaft further comprises a central channel between the proximal and distal ends of the driveshaft, configured to allow aspiration or irrigation of the bone cavity. In one embodiment, each bone sculpting tool has a convex surface and a concave surface, the convex surface configured to contact the bone when the bone sculpting tool is moving along a pre-configured path along the secondary lateral surface in a first direction and the concave surface configured to contact the bone when the bone sculpting tool is moving along a pre-configured path along the secondary lateral surface in a second direction. In one embodiment, the at least one continuous loop of interlocked bone sculpting tools includes two hundred or less bone sculpting tools. In one embodiment, each bone sculpting tool of the plurality of interlocked bone sculpting tools is configured to mill bone when the bone sculpting tool is moving along a pre-configured path along the secondary lateral surface in a first direction and compact bone when the bone sculpting tool is moving along a pre-configured path along the secondary lateral surface in a second direction. In one embodiment, each bone sculpting tool plurality of interlocked bone sculpting tools has a first end and a second end, the first end comprising a substantially spherical protrusion, and the second end comprising a substantially spherical cavity, wherein a continuous loop of interlocked bone sculpting tools is formed by fitting the substantially spherical protrusion of one bone sculpting tool within the substantially spherical cavity of a second bone sculpting tool. In one embodiment, each bone sculpting tool is configured to move with at least three degrees of freedom relative to neighboring bone sculpting tools when the plurality of interlocked bone sculpting tools is formed into at least one continuous loop of interlocked bone sculpting tools. In one embodiment, the at least one torque interface comprises at least one gear. In one embodiment, the at least one torque interface is mechanically coupled to the driveshaft and the continuous loop of interlocked bone sculpting tools. In one embodiment, the tool frame further comprises a proximal end and a distal end, and the bone void sculpting instrument further comprises a plurality of conical bone cavity reaming tools rigidly connected to the distal end of the tool frame, each conical bone cavity reaming tool includes an accessory shaft; at least one cutting disk coupled to the accessory shaft; and an accessory linkage coupling the accessory shaft to the driveshaft; wherein the plurality of conical bone cavity reaming tools are configured to rotate independently from one another and are arranged to form a substantially ovoid cross-sectional milling surface. In one embodiment, the bone void sculpting instrument includes a marking on the tool frame denoting a coronal axis of the bone void sculpting instrument. In one embodiment, the bone void sculpting instrument includes a marking on the tool frame denoting a medial extent of a prosthetic implant to be used in the joint replacement. In one embodiment, the bone void sculpting instrument includes a fiducial marker fixed to the tool frame. In one embodiment, a size and a shape of the tool frame is matched to a size and a shape of a prosthetic implant to be used in the joint replacement. In one embodiment, the tool frame further comprising a neck length, a neck angle, a stem length, and an offset wherein the neck length is between 7 mm and 60 mm, the neck angle is between 105 degrees and 160 degrees, the stem length is between 75 mm and 145 mm, and the offset is between 10 mm and 70 mm.

In various embodiments, a method for preparing a femur for total hip arthroplasty includes preparing a femoral cavity to be sculpted; coupling an attachment configured to deliver torque to a bone void sculpting instrument of a first size; introducing the bone void sculpting instrument to a proximal femur so that at least one continuous loop of interlocked bone sculpting tools moving along a predetermined non-circular path contacts bone; and decoupling the attachment and coupling a provisional femoral neck prosthetic implant trial of a first size to the bone void sculpting instrument.

In one embodiment, the method includes selecting a bone void sculpting instrument of a first size using pre-operative templating. In one embodiment, the method includes compressing a cancellous bone in an intramedullary canal; and removing the bone void sculpting instrument from the proximal femur. In one embodiment, the method includes removing the bone void sculpting instrument of a first size from the proximal femur; coupling the attachment to a bone void sculpting instrument of a second size; introducing the bone void sculpting instrument of a second size to the proximal femur so that at least one continuous loop of interlocked bone sculpting tools of the bone void sculpting instrument contacts bone; and decoupling the attachment and coupling a provisional femoral neck prosthetic implant trial of a second size to the bone void sculpting instrument. In one embodiment, the method includes compressing a cancellous bone in an intramedullary canal; and removing the bone void sculpting instrument from the femoral cavity. In one embodiment, the bone void sculpting instrument is introduced to the proximal femur in a direction collinear with a femoral shaft and lateralized once introduced into the femur. In one embodiment, the step of preparing the femoral cavity to be milled includes making a femoral neck osteotomy for access to a femoral canal; optionally opening a top of the femoral canal; and expanding the femoral canal distally.

In various embodiments, a system for preparing a femur for total hip arthroplasty includes a bone void sculpting instrument that includes a tool frame, which includes a primary lateral surface; at least one secondary lateral surface recessed from the primary lateral surface, wherein the at least one secondary lateral surface has a non-constant radius; and an internal tool frame cavity; a driveshaft having a proximal end and a distal end, wherein the driveshaft is rotatably fixed within the internal tool frame cavity; a drive interface coupled to the proximal end of the driveshaft; a plurality of bone sculpting tools interlocked to form at least one continuous loop around the at least one secondary lateral surface, the at least one continuous loop of interlocked bone sculpting tools having a substantially same cross-sectional shape as the at least one secondary lateral surface, the at least one continuous loop of interlocked bone sculpting tools configured to move along a pre-configured path along the at least one secondary lateral surface; and at least one torque interface coupled to both the driveshaft and the at least one continuous loop of interlocked bone sculpting tools; and an attachment configured to deliver torque to the bone void sculpting instrument, wherein the attachment is rigidly connected to the tool frame of the bone void sculpting instrument and coupled to the drive interface of the bone void sculpting instrument.

In one embodiment, the attachment is a surgical drill. In one embodiment, the attachment is an end-effector of a surgical robot. In one embodiment, the system includes a provisional femoral neck prosthetic implant trial. In one embodiment, the system includes at least one bone void sculpting instrument of a larger size. In one embodiment, the system includes an instrument for performing a femoral neck osteotomy; an instrument for expanding a femoral canal distally; and a plurality of retractors. In one embodiment, the instrument for expanding the femoral canal distally is a flexible reamer. In one embodiment, the system includes a device for opening a top of a femoral canal, the device selected from the group consisting of: a chisel; a rasp; and a broach.

In various embodiments, a system for total hip arthroplasty includes a bone void sculpting instrument includes a tool frame, which includes a primary lateral surface; at least one secondary lateral surface recessed from the primary lateral surface, wherein the at least one secondary lateral surface has a non-constant radius; and an internal tool frame cavity; a driveshaft having a proximal end and a distal end, wherein the driveshaft is rotatably fixed within the internal tool frame cavity; a drive interface coupled to the proximal end of the driveshaft; a plurality of bone sculpting tools interlocked to form at least one continuous loop around the at least one secondary lateral surface, the at least one continuous loop of interlocked bone sculpting tools having a substantially same cross-sectional shape as the at least one secondary lateral surface, the at least one continuous loop of interlocked bone sculpting tools configured to move along a pre-configured path along the at least one secondary lateral surface; and at least one torque interface coupled to both the driveshaft and the at least one continuous loop of interlocked bone sculpting tools; and an attachment configured to deliver torque to the bone void sculpting instrument, wherein the attachment is rigidly connected to the tool frame of the bone void sculpting instrument and coupled to the drive interface of the bone void sculpting instrument; and a prosthetic hip implant.

BRIEF DESCRIPTION OF THE DRAWINGS

Various embodiments are depicted in the accompanying drawings for illustrative purposes, and should in no way be interpreted as limiting the scope of the embodiments. The novel features of the invention are set forth with particularity in the appended claims. Furthermore, various features of different disclosed embodiments can be combined to form additional embodiments, which are part of this disclosure. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE PREFERRED EMBODIMENT

In accordance with various aspects of the present invention, a bone void sculpting instrument for preparing a bone for joint replacement, a method for preparing a femur for total hip arthroplasty, and a system for preparing a femur for total hip arthroplasty are provided.

Figure 1:
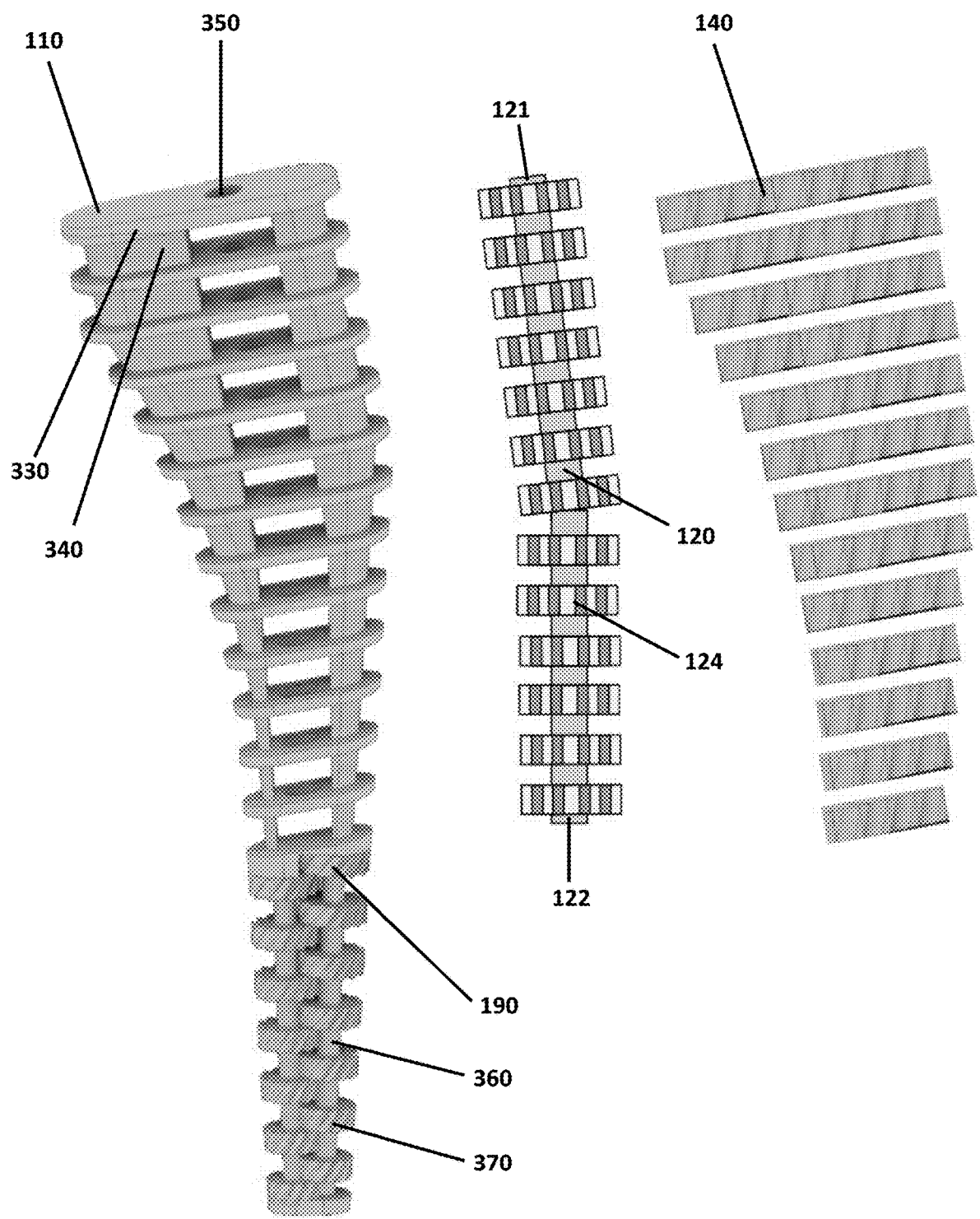
FIG. 1 is an exploded view of a bone void sculpting instrument according to an embodiment of the present invention.

One embodiment of a first aspect of the invention, a bone void sculpting instrument 100, is described with reference to FIG. 1. The bone void sculpting instrument comprises tool frame 110, driveshaft 120, drive interface 130 (not pictured), at least one continuous loop of interlocked bone sculpting tools 140, at least one torque interface 150 (not pictured), and, in some embodiments, a plurality of conical bone cavity reaming tools 190. Tool frame 110 comprises a primary lateral surface 330, at least one secondary lateral surface 340, and internal tool frame cavity 350. Each of the plurality of conical bone cavity reaming tools 190 comprises accessory shaft 360, cutting disks 370, and accessory linkage 380 (not pictured).

Driveshaft 120 is rotatably fixed within internal tool frame cavity 350. Driveshaft 120 has proximal end 121 and distal end 122. The terms proximal end and distal end, as used in this context, refer to the position of an end of the device relative to the remainder of the device or the opposing end as it appears in the drawing. The proximal end can be used to refer to the end manipulated by the user or physician. The distal end can be used to refer to the end of the device that is inserted and advanced within the bone and is furthest away from the physician. As will be appreciated by those skilled in the art, the use of proximal and distal could change in another context, e.g. the anatomical context in which proximal and distal use the patient as reference.

Figure 2A:
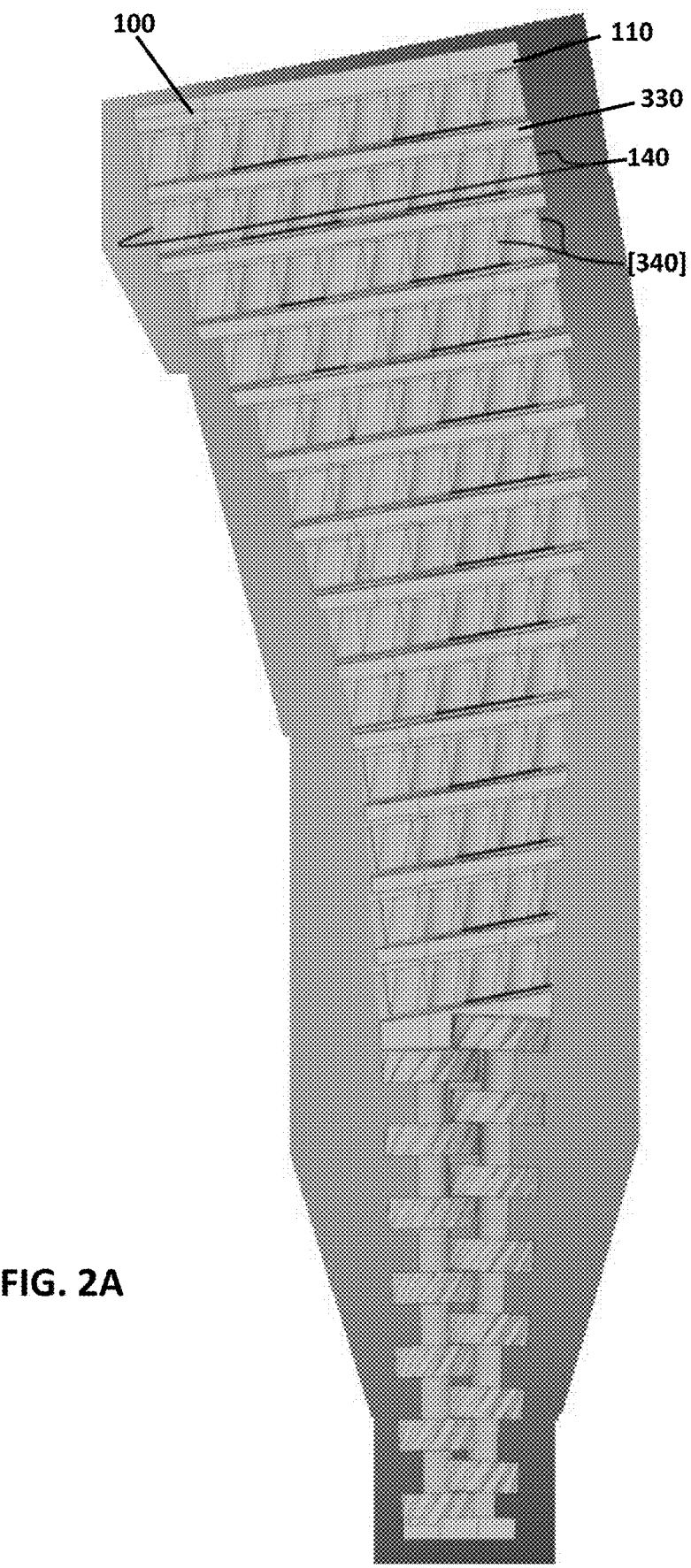
FIG. 2A is a side perspective of an assembled bone void sculpting instrument according to an embodiment of the present invention.

Proximal end 121 of driveshaft 120 is mechanically coupled to drive interface 130 (not pictured). Driveshaft 120 is also coupled to at least one torque interface 150 (not pictured); each torque interface is also coupled to a corresponding at least one continuous loop of interlocked bone sculpting tools 140. As illustrated with reference to FIG. 2A, each continuous loop of interlocked bone sculpting tools 140 surrounds a corresponding at least one secondary lateral surface 340, the circumference of each continuous loop of interlocked bone sculpting tools 140 chosen so that each continuous loop of interlocked bone sculpting tools 140 moveably contacts the corresponding secondary lateral surface 340. Returning to FIG. 1, in embodiments having a plurality of conical bone cavity reaming tools 190, driveshaft 120 is also coupled to accessory shafts 360 via accessory linkages 380 (not pictured). Cutting disks 370 are coupled to accessory shafts 360.

Figure 2B:
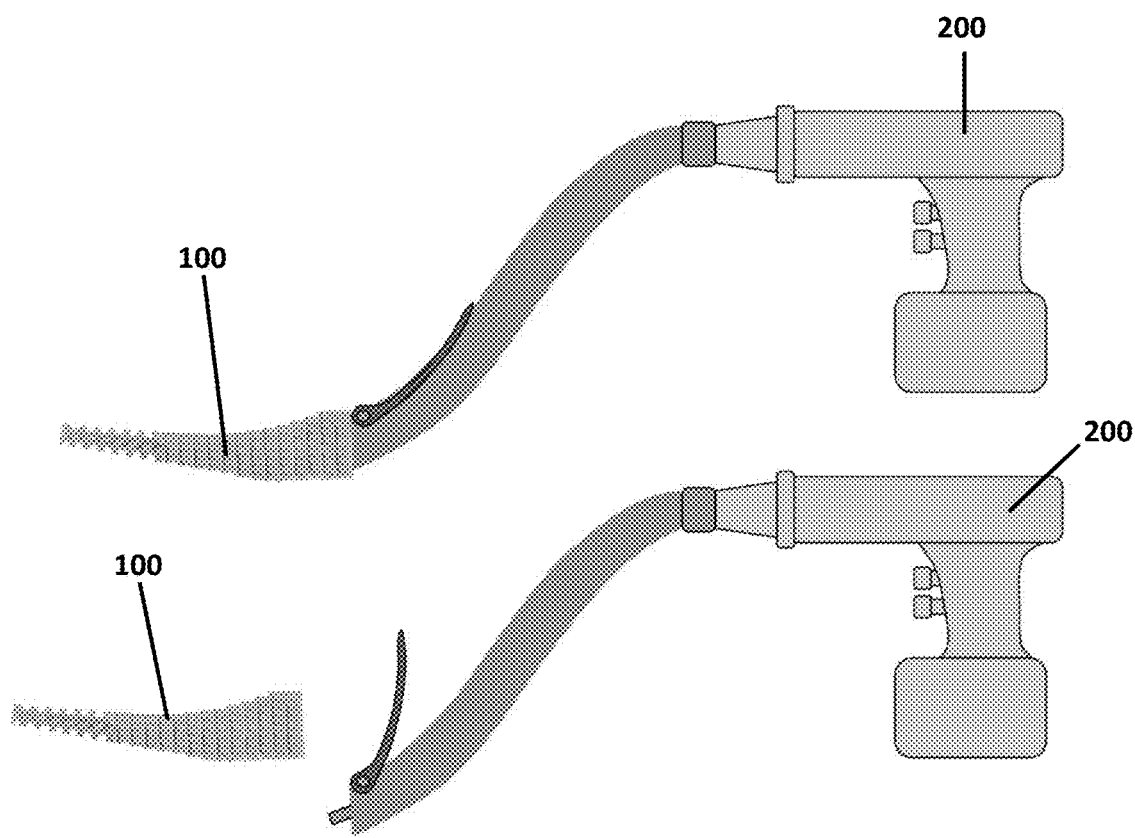
FIG. 2B is a side schematic view of a bone void sculpting instrument according to an embodiment of the present invention coupled with and separated from an attachment configured to deliver torque to the bone void sculpting instrument.

In operation, an attachment configured to deliver torque 200, as illustrated in FIG. 2B, such as a conventional surgical drill, a conventional surgical robot end-effector, or a powered insertion handle designed specifically for use with the bone void sculpting instrument 100. The attachment 200 is rigidly connected to tool frame 110 and rotatably coupled to drive interface 130. The attachment 200 may have an offset orientation similar to the orientation of conventional broach handles and may have a device to release the attachment from bone void sculpting instrument, such as a release lever. The attachment 200 provides torque to drive interface 130 in a first direction of rotation. The attachment 200 may provide a range of torque values to the drive interface at a range of rotational speeds.

Returning to FIG. 1, drive interface 130 transfers the torque from attachment 200 to driveshaft 120. Driveshaft 120 provides the torque to the at least one continuous loop of interlocked bone sculpting tools 140, transferring the torque from driveshaft 120 to continuous loops of interlocked bone sculpting tools 140 through the corresponding torque interfaces 130, causing the interlocked bone sculpting tools 140 to move in a first direction along a pre-determined path on secondary lateral surfaces 340. When bone void sculpting instrument 100 is introduced to a bone cavity, such as the femoral cavity, such that the continuous loops of interlocked bone sculpting tools 140 come into contact with bone, the motion of the interlocked bone sculpting tools in a first direction mills the bone cavity. The use of continuous loops of interlocked bone sculpting tools 140 moving along a pre-determined path on secondary lateral surfaces 340 to mill the bone cavity advantageously allows for the bone cavity to be sculpted into a non-circular cross-section to match an irregular shape of a prosthetic implant. In addition, use of the continuous loops of interlocked bone sculpting tools 140 moving along a pre-determined path on secondary lateral surfaces 340 enables the physician to introduce the device using a minimally invasive surgical method that does not provide collinear access to the bone cavity, yet still causes low peak mechanical stresses in the bone while milling the bone cavity.

In embodiments having conical bone cavity reaming tools 190, driveshaft 120 also provides torque to accessory shafts 360 of conical bone cavity reaming tools 190 through accessory linkages 380, causing accessory shafts 360 to rotate. The rotation of accessory shafts 360 causes cutting disks 370 to rotate, reaming bone when the instrument is introduced to a bone cavity such that cutting disks 370 come in contact with bone. Conical bone cavity reaming tools 190 advantageously allow the reaming of a bone cavity matching the non-circular shape of a prosthetic implant in distal portions of the bone cavity too narrow in anterior-posterior diameter to be milled by the continuous loops of interlocked bone sculpting tools 140.

Bone cavity sculpting instrument 100 may also receive torque from attachment 200 in a second direction of rotation. In one embodiment, Drive interface 130 may include a reversal mechanism, such as a reverse gear, in drive interface 130 so that drive interface 130 may receive torque in a first direction of rotation but provide driveshaft 120 with torque in a second direction of rotation. In one embodiment, after receiving the torque in a second direction of rotation from attachment 200, drive interface 130 transfers the torque to driveshaft 120. Driveshaft 120 provides the torque in a second direction to continuous loops of interlocked bone sculpting tools 140, transferring the torque from driveshaft 120 to continuous loops of interlocked bone sculpting tools 140 via torque interfaces 130, causing the interlocked bone sculpting tools 140 to move in a second direction along a pre-determined path on secondary lateral surfaces 340. When bone void sculpting instrument 100 is introduced to a bone cavity, such as the intramedullary canal, so that the continuous loops of interlocked bone sculpting tools 140 come into contact with bone, the motion of the interlocked bone sculpting tools in a second direction compresses the soft bone, such as the cancellous bone in the intramedullary canal, in a radial direction away from the centerline of the bone cavity. This compression offers the advantage of forming the bone cavity into the shape of the final prosthetic implant, better preparing the bone cavity for the shape of the final implant by improving the match between the prosthetic implant and the bone cavity, as well as improving the mechanical properties of the bone, such as the density, resulting in better clinical outcomes when the implant is installed.

Figure 3:
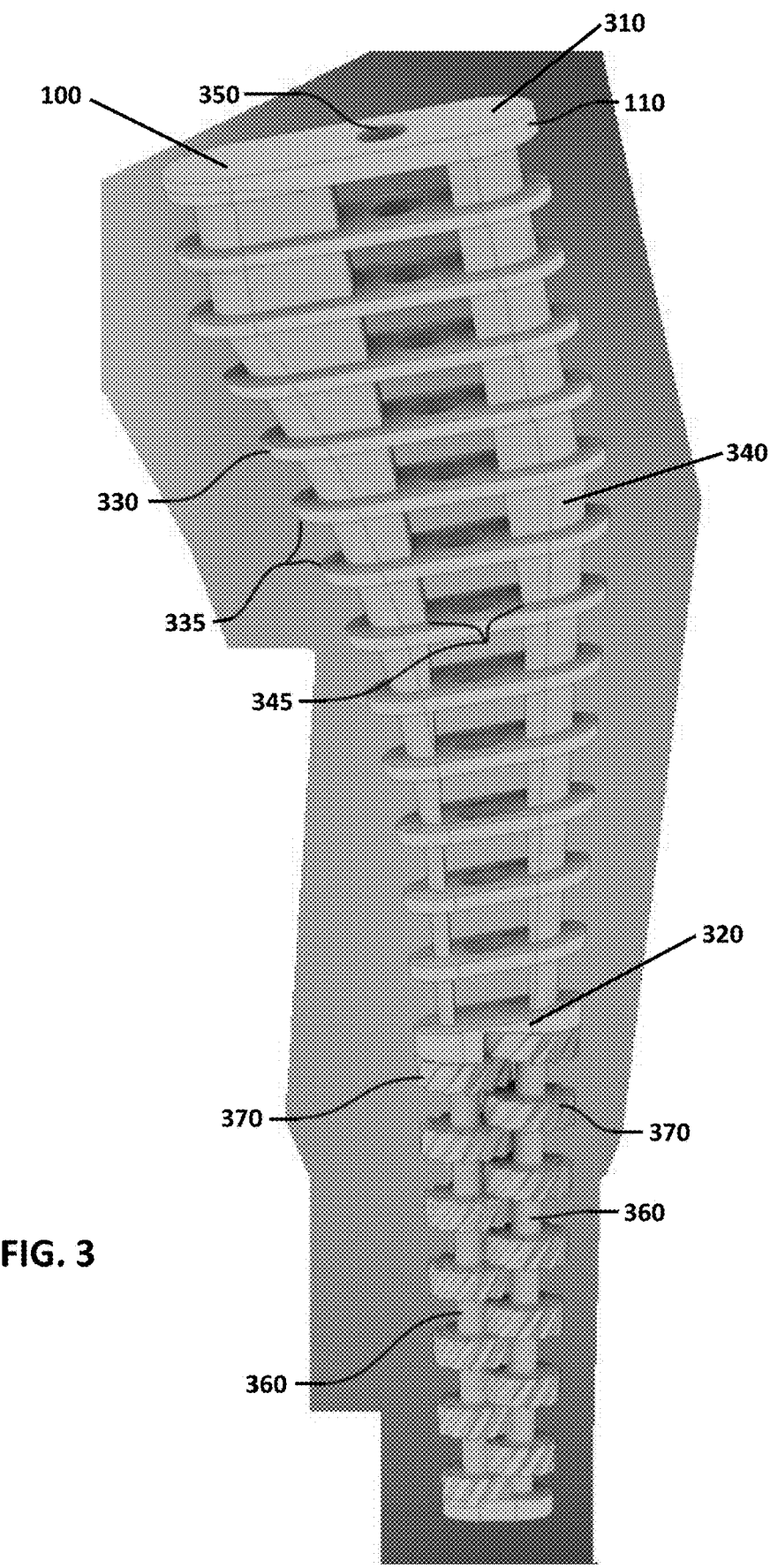
FIG. 3 is a side schematic view of certain subassemblies of a bone void sculpting instrument according to an embodiment of the present invention.

Tool frame 110 provides support and guidance for the components of the bone void sculpting instrument, helping the surgeon position the bone sculpting tools in the appropriate location. The tool frame 110 is a rigid structure formed to match the size and shape of a prosthetic implant to be used for the joint replacement, for example by preoperative templating. This size and shape match to the prosthetic implant advantageously provides the bone void sculpting instrument the ability to prepare a bone for an irregularly shaped prosthetic implant. With further reference to FIG. 3, tool frame 110 comprises a primary lateral surface 330, at least one secondary lateral surface 340, and internal tool frame cavity 350. Primary lateral surface 330 comprises the primary surface of the bone sculpting tool, intended to closely match the size and shape of the of the prosthetic implant to be introduced. Accordingly, primary lateral surface 330 may comprise a variety of shapes and contours, and in some embodiments, will not form a contiguous surface.

The at least one secondary lateral surface 340 is recessed from the primary lateral surface 330, forming a circumferential track around tool frame 110 substantially perpendicular to the proximal-distal axis of the tool frame. As many as fifty secondary lateral surfaces may be provided in the tool frame, each secondary lateral surface 340 substantially parallel to the other secondary lateral surfaces. As illustrated with reference to FIG. 4, secondary lateral surface 340 has a radius 410 measured from the central axis 420 of the tool frame. Radius 410 is not constant for all points on the secondary lateral surface 340. A continuous loop of interlocked bone sculpting tools 140 rings each secondary lateral surface 340, each continuous loop of interlocked bone sculpting tools 140 having a circumference selected so that the continuous loop of interlocked bone sculpting tools 140 has substantially the same cross-sectional shape as the corresponding secondary lateral surface 340 and is in moveable contact with the corresponding secondary lateral surface. Each secondary lateral surface 340 forms a pre-determined path around which the corresponding continuous loop of interlocked bone sculpting tools 140 moves when the bone void sculpting instrument is in operation. Because each secondary lateral surface 340 has a non-constant radius 410, the cross-sectional shape 400 of each secondary lateral surface is non-circular, for example ovoid, as is the cross-sectional shape of each continuous loop of interlocked bone sculpting tools 140. The non-circular cross-sectional shape of the secondary lateral surfaces 340 and continuous loops of interlocked bone sculpting tools 140 results in a non-circular milling surface as each continuous loop of interlocked bone sculpting tools 140 moves along a non-circular pre-determined path formed by the corresponding secondary lateral surface 340. This non-circular milling surface advantageously helps better match an irregular cross-sectional shape of a prosthetic implant, reduces peak mechanical stress imposed on the bone when milling bone in non-circular shapes as compared to conventional milling tools, and does not require collinear access to the bone cavity to successfully mill the bone cavity, advantageously allowing use of minimally invasive surgical approaches.

Returning to FIG. 3, the tool frame 110 may have at least one coronal cut-out 345 where a portion of the secondary lateral surface 340 has been removed so that the at least one torque interface 150 (not pictured) may couple with the corresponding continuous loop of interlocked bone sculpting tools 140. The coronal cutout 345 is positioned so that it does not substantially affect the cross-sectional shape formed by continuous loop of interlocked bone sculpting tools 140 when the continuous loop of interlocked bone sculpting tools is assembled on the secondary lateral surface 340 or the pre-determined path for the continuous loop of interlocked bone sculpting tools 140 formed by the secondary lateral surface 340.

Tool frame 110 has proximal end 310 and distal end 320. Internal tool frame cavity 350 extends through proximal end 310 to distal end 320. In some embodiments, internal tool frame cavity 350 may extend through distal end 320 to couple with accessory linkages 380. Internal tool frame cavity 350 may be a centrally located circular channel. Depending on the shape of the tool frame 110, internal tool frame cavity 350 may change direction in the proximal-distal axis to correspond with the axial profile of the tool frame.

The tool frame 110 comprises rigid, corrosion-resistant material, for example a metal (such as stainless steel, aluminum, or other corrosion-resistant alloys), ceramic, rigid polymer, a combination of such materials, or a natural or engineered composite material having rigid and corrosion-resistant properties. Tool frame 110 may comprise one continuous piece of material, or a plurality of rigidly connected segments 335. In embodiments in which the tool frame 110 comprises a plurality of rigidly connected segments 335, the segments may be fixedly or detachably connected. The tool frame 110 may comprise one or more markings indicating the coronal axis of the bone void sculpting instrument to align the device with the patient's native anteversion during stem insertion. The tool frame 110 may comprise one or more markings indicating the medial extent of the of the prosthetic implant's intended location based on a plan for restoration of the patient's leg length. A fiducial marker may be attached to the tool frame to indicate the device's location to a navigation registration system or to provide a reference location under fluoroscopy or other imaging technology. Tool frame 110 may be configured to be coupled with provisional joint replacement trial.

Figure 5:
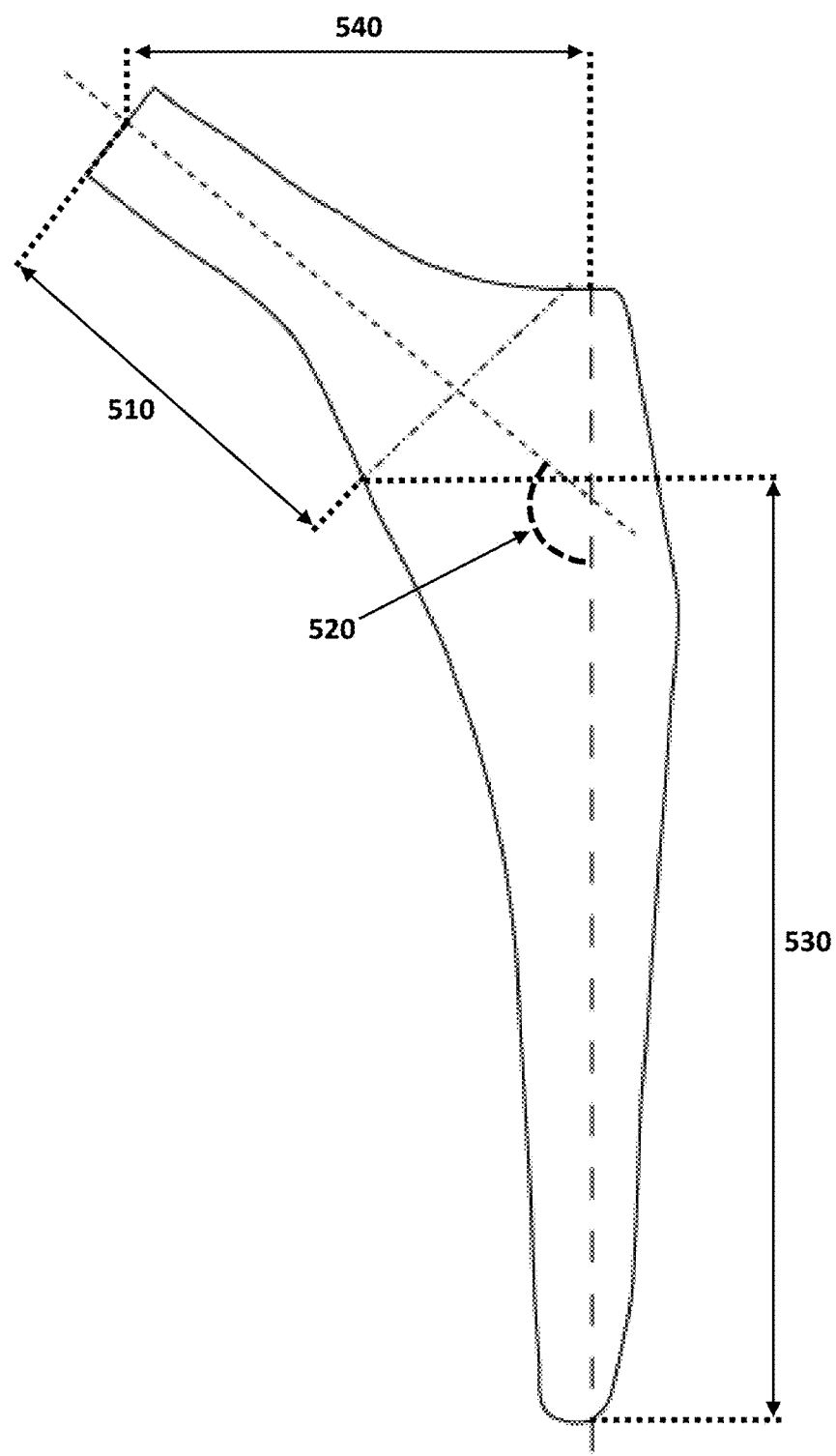
FIG. 5 is a side schematic view of the dimensions of a prosthetic hip implant corresponding to the dimensions of a matching bone void sculpting instrument according to an embodiment of the present invention.

In some embodiments in which the bone void sculpting instrument is used to prepare a femur for total hip arthroplasty, illustrated with further reference to FIG. 5, tool frame 110 comprises four dimensions: neck length 510, neck angle 520, stem length 530, and offset 540. Dimensions should be chosen to match the shape of the prosthetic implant to be used in the total hip arthroplasty and may be chosen based on pre-operative templating. Neck length 510 may measure from 7 mm to 60 mm. Neck angle 520 may measure from 105 degrees to 160 degrees. Stem length 530 may measure 75 mm to 145 mm. Offset 540 may measure from 10 mm to 70 mm. Exemplary dimensions for various bone sculpting instrument sizes chosen to match the sizes of certain commercially available prosthetic hip implants are illustrated in the table below.

| Size | Neck Angle (deg.) | Neck Length (mm) | Stem Length (mm) | Offset (mm) |
| --- | --- | --- | --- | --- |
| 0 | 132 | 27 | 93 | 28 |
| 1 | 132 | 27 | 96 | 29 |
| 2 | 132 | 30 | 99 | 33 |
| 3 | 132 | 30 | 102 | 35 |
| 4 | 132 | 35 | 105 | 38 |
| 5 | 132 | 35 | 108 | 40 |
| 6 | 132 | 35 | 111 | 41 |
| 7 | 132 | 37 | 114 | 46 |
| 8 | 132 | 37 | 117 | 47 |
| 9 | 132 | 37 | 120 | 49 |
| 10 | 132 | 40 | 123 | 51 |
| 11 | 132 | 40 | 126 | 53 |

In some embodiments, progressively larger bone void sculpting instruments 100 may be introduced to the bone to prepare the bone for joint replacement. In these embodiments, each tool frame 110 used may comprise as size and shape between a patient's initial anatomy of the bone cavity to be sculpted and the size and shape of the final prosthetic implant to be used for joint replacement.

Returning to FIG. 1, driveshaft 120 is a rigid shaft for transmitting torque through bone void sculpting instrument 100. The size and shape of driveshaft 120 is selected to fit within internal tool frame cavity 350, in which driveshaft 120 is rotatably fixed. To accommodate the shape of of the internal tool frame cavity 350 when tool frame 110 is curved to match the shape of the prosthetic implant to be used in the joint replacement, driveshaft 120 may be composed of multiple segments coupled together. Such segments may be coupled through a universal joint, a mechanical coupling, or another coupling mechanism for transferring torque between shaft segments. Proximal end 121 of driveshaft 120 may be coupled to drive interface 130, or alternatively, directly coupled to an external source of torque such as attachment 200. In embodiments with conical bone cavity reaming tools 190, distal end 122 of driveshaft 120 may be coupled to accessory linkages 380. Driveshaft 120 may comprise gears 124 rigidly connected to driveshaft 120 to transmit torque between driveshaft 120 and torque interfaces 150, drive interface 130 and driveshaft 120, or driveshaft 120 and accessory linkages 380. Driveshaft 120 may alternatively comprise other structures known in the art to transmit torque. Alternative structures may comprise mechanical torque couplings, such as pulleys or sprockets, or electromagnetic or other torque couplings. Driveshaft 120 may comprise a central channel (126, not pictured) from proximal end 121 to distal end 122. The central channel may be configured for aspiration of bone marrow when the bone cavity sculpting tool 100 is used for milling bone. When used to prepare a bone cavity for joint replacement, such aspiration advantageously decreases the incidence of fat embolization. The central channel (not pictured) may also be configured for irrigation. Irrigation using sterile fluid or sterile solution may be advantageously used when milling dense bone to decrease the risk of thermal necrosis or used when the device is not engaged in milling bone to clean the continuous loops of interlocked bone sculpting tools 140. Drive shaft 120 may be configured to be coupled with provisional joint replacement trial.

Drive interface 130 comprises a coupling between driveshaft 120 and an external source of torque, such as attachment 200. The coupling may be a shaft coupling, collar, chuck, collet, or other mechanical linkage, or any other linkage sufficient to transmit an acceptable portion of the torque provided by the external source of torque to driveshaft 120. Drive interface 130 may be fixedly or detachably connected to driveshaft 120. Drive interface 130 may also be fixedly or detachably connected to tool frame 120. Drive interface 130 may be configured to be coupled with provisional joint replacement trial.

Figure 4:
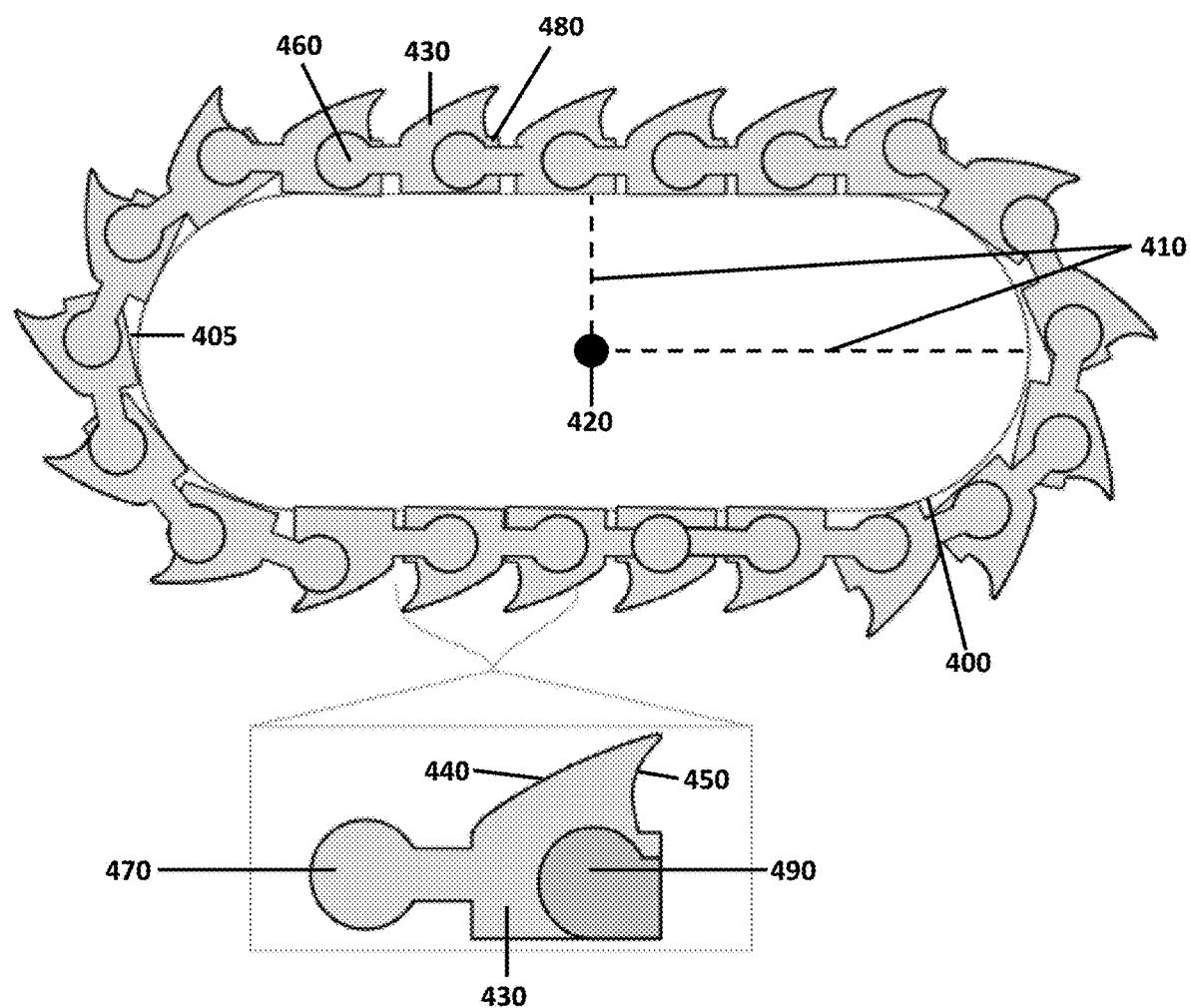
FIG. 4 is a cross-sectional view of certain subassemblies of a bone void sculpting instrument according to an embodiment of the present invention.

An embodiment of interlocked bone sculpting tools 140 is illustrated in further detail in FIG. 4. Each bone sculpting tool 430 includes a first surface 440 shaped for milling bone and a second surface 450 shaped for compressing bone. The first surface 440 may comprise a convex profile to mill bone. The second surface 450 may comprise a concave profile to compress bone. Each bone sculpting tool's profile may be further shaped to form a cutting angling mimicking the contour of the final prosthetic implant to be used in the joint replacement. Cutting angles may range from 90 to 180 degrees from the proximal-distal axis of the bone void sculpting instrument, more preferably 120 to 160 degrees.

To interlock with one another, each bone sculpting tool 430 has a first end 460 and second end 480. First end 460 may comprise a substantially spherical protrusion 470. Second end 480 may comprise a substantially spherical cavity 490. As shown in the embodiment illustrated in FIG. 4, to interlock the bone sculpting tools, the substantially spherical protrusion 470 of one bone sculpting tool is secured within the substantially spherical cavity 490 of the neighboring bone sculpting tool. In various embodiments, as many as three hundred, two hundred, one hundred fifty, one hundred, seventy five, fifty, or twenty five bone sculpting tools may be interlocked to form a continuous loop of interlocking bone sculpting tools. The number and size of the bone sculpting tools to be interlocked should be chosen so the continuous loop of interlocked bone sculpting tools 140 has adequate tension to remain in moveable contact with the corresponding torque interface 130 and to maintain a substantially similar cross-sectional shape 400 as the corresponding secondary lateral surface 340 around which the continuous loop of interlocked bone sculpting tools 140 moves along a pre-determined path. The interlocking design of the bone sculpting tools of the embodiment illustrated in FIG. 4 offers the advantage of providing each bone sculpting tool three degrees of freedom relative to its neighboring bone sculpting tools when formed into a continuous loop of interlocked bone sculpting tools 140, providing the continuous loop of interlocked bone sculpting tools 140 the ability to move along pre-determined paths along the secondary lateral surfaces 340 of a variety of shapes. However, other designs to interlock the bone sculpting tools providing at least one degree of freedom for each bone sculpting tool relative to neighboring bone sculpting tools may be used to form the continuous loop of interlocked bone sculpting tools 140.

The medial surface 405 of the continuous loops of interlocked bone sculpting tools 140 is configured to couple with torque interfaces 150. For example, when the bone sculpting tools are interlocked in a continuous loop, the medial surface 405 may have a profile comprising a repeating pattern of serrations, teeth, notches, or the like that can intermesh with one or more gears or sprockets. Each bone sculpting tool 430 comprises a rigid, corrosion-resistant material, for example a metal (such as stainless steel, aluminum, or other corrosion-resistant alloys), ceramic, rigid polymer, a combination of such materials, or a natural or engineered composite material having rigid and corrosion-resistant properties.

Torque interfaces 150 receive torque from driveshaft 120 and transmit it to continuous loops of interlocked cutting tools 140. Torque interfaces 150 may comprise any suitable mechanism to transfer torque from the driveshaft 120 to the continuous loops of interlocked cutting tools 140. For example, torque interfaces 150 may comprise one or more gears. In such an embodiment, the one or more gears of each torque interface are intermeshed with a gear on driveshaft 120 to receive torque from the driveshaft 120 and intermeshed with the profile of the medial surface of the continuous loop of interlocked bone sculpting tools 405 to transfer the torque from driveshaft 120 to continuous loop of interlocked cutting tools 140. When so coupled to the driveshaft 120 and a continuous loop of interlocked cutting tools 140, each torque interface 150 transfers an acceptable portion of the torque received from driveshaft 120 to the corresponding continuous loop of interlocked bone sculpting tools 140, causing the continuous loop of interlocked bone sculpting tools 140 to move along a pre-determined path along secondary lateral surfaces 340. Torque interfaces may be rotatably fixed to tool frame 110.

In some joint replacements, the anterior-posterior diameter of the distal end of the final prosthetic implant, and therefore the anterior-posterior diameter of the cavity to match the prosthetic implant, is smaller than the diameter that may be accommodated using the continuous loops of interlocked bone sculpting tools 140. To sculpt a narrow diameter bone cavity for the distal end of a prosthetic implant, bone void sculpting instrument 100 may include a plurality of conical bone cavity reaming tools 190. Conical bone cavity reaming tools 190 each comprise an accessory shaft 360, cutting disks 370, and an accessory linkage 380. Accessory linkages 380 couple driveshaft 120 to accessory shafts 360. Accessory linkages 380 may comprise gears, pulleys and belts, chains and sprockets, or other mechanical linkages or couplings. For example, accessory linkage 380 may comprise a gear fixed on accessory shaft 360 intermeshed with a gear 124 on driveshaft 120. Accessory shafts 360 are rotatably attached to distal end 320 of tool frame 110 and extend from distal end 320. Accessory shafts 360 comprise a length selected to match the length of a prosthetic implant to be used in a joint replacement and a diameter sufficient to prevent harmful vibration or cutting disk chatter when cutting disks 370 are reaming a bone cavity. Cutting disks 370 are coupled to an accessory shaft 360. Cutting disks 370 comprise circular cutting tools having diameters, cutting edges, and cutting angles chosen to match the contour of a prosthetic implant to be used in a joint replacement. The plurality of conical bone cavity reaming tools is arranged so that the cutting disks 370 form a cutting surface having a desired cross-sectional shape, for example, an ovoid cross-section. The cutting disks 370 of each conical bone cavity reaming tool 190 are staggered along the proximal-distal axis relative to the cutting disks of other conical bone cavity reaming tools so that the accessory shafts 360 of each conical bone cavity reaming tool 190 may rotate independently and cutting disks 370 of each conical bone cavity reaming tool 190 do not interfere with one another.

Figure 6A:
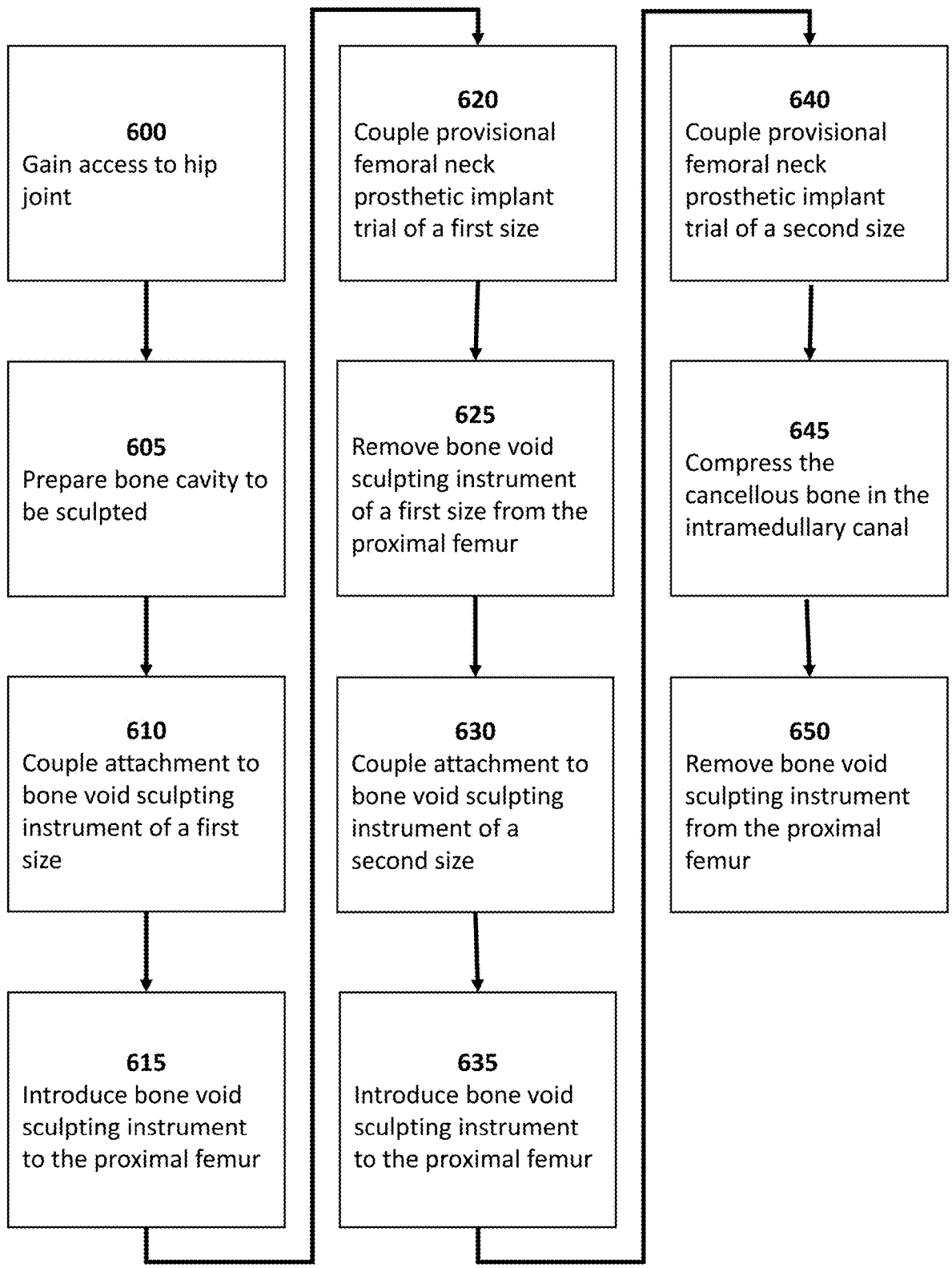
FIG. 6A is a block diagram of a method for preparing a femur for a total hip arthroplasty according to one embodiment of the present invention.
Figure 6B:
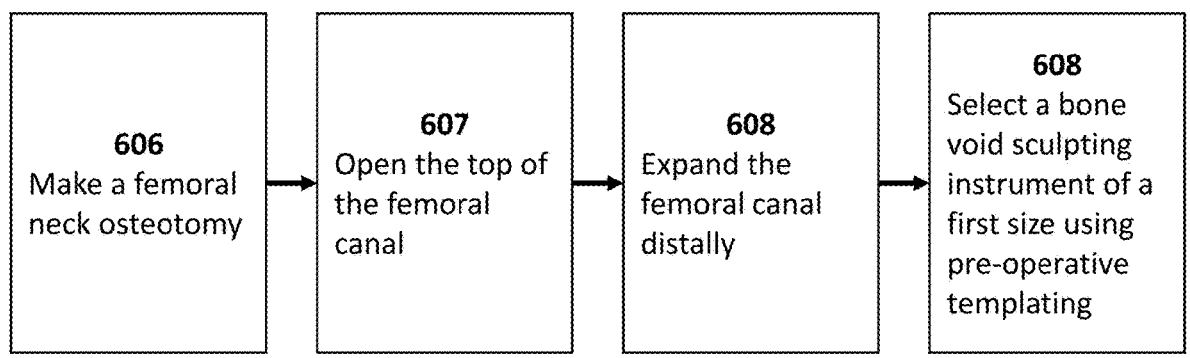
FIG. 6B is a block diagram of steps for preparing a femur for a total hip arthroplasty according to one embodiment of the present invention.
Figure 6C:
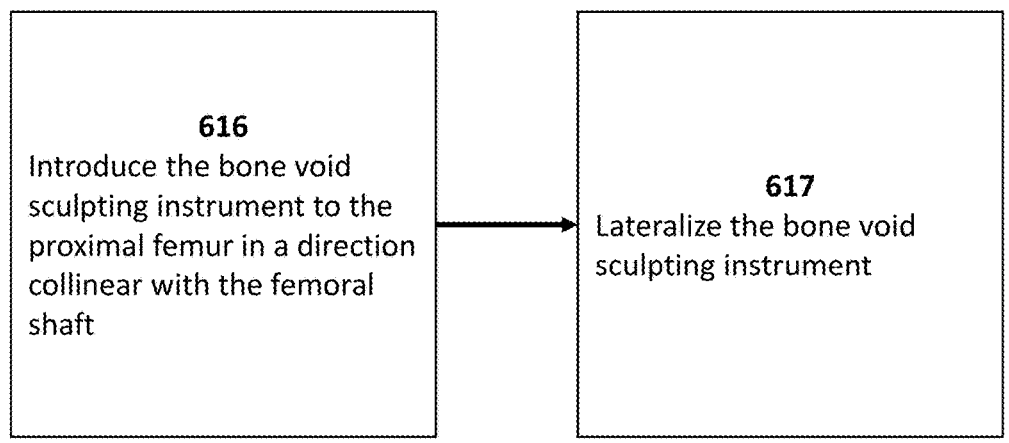
FIG. 6C is a block diagram of steps for preparing a femur for a total hip arthroplasty according to one embodiment of the present invention.

A further aspect of the present invention is a method for preparing a femur for a total hip arthroplasty, as illustrated with reference to FIGS. 6A, 6B, and 6C. First, with reference to FIG. 6A, one of a variety of available surgical approaches is used to gain access to the hip joint 600. Before sculpting the bone cavity, the physician must prepare the femoral cavity 605. Preparation of the femoral canal occurs at a variable time during a surgical workflow depending on surgeon preference and may occur before surgical hip dislocation, following the surgical preparation of the acetabulum to accept a prosthetic acetabular cup, or otherwise. As illustrated with respect to FIG. 6B, preparing the proximal femur is typically initiated by making a femoral neck osteotomy 606 for access to the femoral canal and making a plan for restoration of patient leg-length based on the height of the neck osteotomy. The top of the femoral canal may optionally then be opened 607 using a tool such as a rasp, a chisel, or a broach. Then, the femoral canal is expanded distally 608 using a provisional flexible reamer, and retractors may be applied. Retractors may then be applied to gain optimal exposure of the proximal femur. Based on preoperative templating, a first size of a bone void sculpting instrument is selected 609.

Returning to FIG. 6A, the bone void sculpting instrument is coupled to an attachment configured to deliver torque 610. The bone void sculpting instrument is then introduced to the proximal femur 615. Then, the attachment is powered on, causing it to provide torque to the bone void sculpting instrument in a first direction and the continuous loops of interlocked bone sculpting tools to begin moving along the pre-determined paths of the secondary lateral surfaces. The bone void sculpting instrument is then slowly introduced into the proximal femur 615.

As illustrated with reference to FIG. 6C, the bone void sculpting instrument may be introduced to the proximal femur in a direction collinear with the femoral shaft 616 before being slowly lateralized 617 to prevent *varus* stem positioning without the need for removing excess bone from the femur prior to starting the preparation process as is typically done. When the continuous loops of bone sculpting tools are brought in contact with the femoral cavity bone, the bone void sculpting instrument begins slowly mill away the cancellous bone of the proximal femur as it is introduced in a fashion that is highly correspondent to the final implant shape while under conditions of extremely low peak stress to the patient bone. The device is introduced to the femur in a proximal-distal direction until resistance is met when reaching the most distal possible excursion of the stem based on patient anatomy and stem shape.

The surgeon may optionally couple a provisional femoral prosthetic implant neck trial of a first size to the bone void sculpting instrument 620 and introduce a provisional femoral head to test the stability of the hip joint. Or, the physician may decide to change the size of the prosthetic implant stem based on the relation of bone void sculpting instrument with the femoral neck cut based on evaluation of the stem size needed to restore patient-specific anatomy. If a different sized stem is chosen, the bone void sculpting instrument of a first size is removed from the proximal femur 625. A bone void sculpting instrument of a second size matching the size of the new stem is couple to the attachment 630 and is introduced to the proximal femur in a similar manner 635.

When satisfied with the current femoral stem size, the attachment is detached from the bone void sculpting instrument, allowing it to remain in the proximal femur. The physician may then couple a provisional femoral neck trial to the bone void sculpting instrument, followed by a provisional femoral head 645. The hip can then be reduced, and the stability of the prosthetic hip construct tested in a standard fashion. When satisfied with the hip stability, the physician may recouple the attachment to the bone void sculpting instrument and optionally power on the attachment to deliver torque in a second direction to the bone void sculpting instrument, causing the bone void sculpting instrument to compress the cancellous bone in the intramedullary canal 645. The physician may then remove the bone void sculpting instrument from the proximal femur 650, and then implant a final femoral stem to conclude the operation.

A further aspect of the present invention is a system for preparing a femur for total hip arthroplasty. The system comprises a bone void sculpting instrument 100 as described in other aspects of the invention and an attachment 200 configured to deliver torque to the bone void sculpting instrument. The attachment may be conventional surgical drill, a conventional surgical robot end-effector, or a powered insertion handle designed specifically for use with the bone void sculpting instrument The attachment 200 may have an offset orientation similar to the orientation of conventional broach handles and may have a device to release the attachment from bone void sculpting instrument, such as a release lever. The attachment 200 provides torque to drive interface 130 in a first direction of rotation. The attachment 200 may provide a range of torque values to the drive interface at a range of rotational speeds. The system may further comprise a provisional femoral neck prosthetic implant trial that can be coupled to the bone void sculpting instrument to test hip stability and evaluate the femoral stem size needed to restore patient-specific anatomy. The system may further comprise at least one bone void sculpting instrument of a larger size. The system may further comprise an instrument performing a femoral neck osteotomy. The system may further comprise a device for opening the top of a femoral canal, such as a chisel, a rasp, or a broach. The system may further comprise an instrument to expand the femoral canal distally, such as a provisional flexible reamer. The system may further include a plurality of retractors to gain optimal exposure of the proximal femur.

A further aspect of the present invention is a system for total hip arthroplasty. The system comprises a bone void sculpting instrument 100 as described in other aspects of the invention, an attachment 200 configured to deliver torque to the bone void sculpting instrument, and a prosthetic hip implant.

Although this disclosure has been described in the context of certain embodiments and examples, it will be understood by those skilled in the art that the disclosure extends beyond the specifically disclosed embodiments to other alternative embodiments and/or uses and obvious modifications and equivalents thereof. In addition, while several variations of the embodiments of the disclosure have been shown and described in detail, other modifications, which are within the scope of this disclosure, will be readily apparent to those of skill in the art. It is also contemplated that various combinations or sub-combinations of the specific features and aspects of the embodiments may be made and still fall within the scope of the disclosure. For example, features described above in connection with one embodiment can be used with a different embodiment described herein and the combination still fall within the scope of the disclosure. It should be understood that various features and aspects of the disclosed embodiments can be combined with, or substituted for, one another in order to form varying modes of the embodiments of the disclosure. Thus, it is intended that the scope of the disclosure herein should not be limited by the particular embodiments described above. Accordingly, unless otherwise stated, or unless clearly incompatible, each embodiment of this invention may comprise, additional to its essential features described herein, one or more features as described herein from each other embodiment of the invention disclosed herein.

Features, materials, characteristics, or groups described in conjunction with a particular aspect, embodiment, or example are to be understood to be applicable to any other aspect, embodiment or example described in this section or elsewhere in this specification unless incompatible therewith. All of the features disclosed in this specification (including any accompanying claims, abstract and drawings), and/or all of the steps of any method or process so disclosed, may be combined in any combination, except combinations where at least some of such features and/or steps are mutually exclusive. The protection is not restricted to the details of any foregoing embodiments. The protection extends to any novel one, or any novel combination, of the features disclosed in this specification (including any accompanying claims, abstract and drawings), or to any novel one, or any novel combination, of the steps of any method or process so disclosed.

Furthermore, certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as a subcombination or variation of a subcombination.

Moreover, while operations may be depicted in the drawings or described in the specification in a particular order, such operations need not be performed in the particular order shown or in sequential order, or that all operations be performed, to achieve desirable results. Other operations that are not depicted or described can be incorporated in the example methods and processes. For example, one or more additional operations can be performed before, after, simultaneously, or between any of the described operations. Further, the operations may be rearranged or reordered in other implementations. Those skilled in the art will appreciate that in some embodiments, the actual steps taken in the processes illustrated and/or disclosed may differ from those shown in the figures. Depending on the embodiment, certain of the steps described above may be removed, others may be added. Furthermore, the features and attributes of the specific embodiments disclosed above may be combined in different ways to form additional embodiments, all of which fall within the scope of the present disclosure. Also, the separation of various system components in the implementations described above should not be understood as requiring such separation in all implementations, and it should be understood that the described components and systems can generally be integrated together in a single product or packaged into multiple products.

For purposes of this disclosure, certain aspects, advantages, and novel features are described herein. Not necessarily all such advantages may be achieved in accordance with any particular embodiment. Thus, for example, those skilled in the art will recognize that the disclosure may be embodied or carried out in a manner that achieves one advantage or a group of advantages as taught herein without necessarily achieving other advantages as may be taught or suggested herein.

Conditional language used herein, such as, among others, "can," "could," "might." "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising." "including," "having." and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Conjunctive language such as the phrase "at least one of X, Y, and Z." unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately." "about," "generally." and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than 10% of, within less than 5% of, within less than 1% of, within less than 0.1% of, and within less than 0.01% of the stated amount. As another example, in certain embodiments, the terms "generally parallel" and "substantially parallel" refer to a value, amount, or characteristic that departs from exactly parallel by less than or equal to 15 degrees, 10 degrees, 5 degrees, 3 degrees, 1 degree, 0.1 degree, or otherwise.

Any methods disclosed herein need not be performed in the order recited. The methods disclosed herein include certain actions taken by a practitioner; however, they can also include any third-party instruction of those actions, either expressly or by implication. For example, actions such as "controlling a motor speed" include "instructing controlling of a motor speed."

The scope of the present disclosure is not intended to be limited by the specific disclosures of preferred embodiments in this section or elsewhere in this specification, and may be defined by claims as presented in this section or elsewhere in this specification or as presented in the future. The language of the claims is to be interpreted broadly based on the language employed in the claims and not limited to the examples described in the present specification or during the prosecution of the application, which examples are to be construed as non-exclusive.

Since many modifications, variations, and changes in detail can be made to the described preferred embodiment of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A bone void sculpting instrument for preparing a bone for joint replacement comprising:
   a tool frame, comprising:
      a primary lateral surface;
      at least one secondary lateral surface recessed from the primary lateral surface, wherein the at least one secondary lateral surface has a non-constant radius; and
      an internal tool frame cavity;
   a driveshaft having a proximal end and a distal end, wherein the driveshaft is rotatably fixed within the internal tool frame cavity;
   a drive interface coupled to the proximal end of the driveshaft;
   a plurality of interlocked bone sculpting tools configured to form at least one continuous loop around the at least one secondary lateral surface, the at least one continuous loop of the plurality of interlocked bone sculpting tools having a substantially same cross-sectional shape as the at least one secondary lateral surface, the at least one continuous loop of the plurality of interlocked bone sculpting tools configured to move along a pre-configured path along the at least one secondary lateral surface; and
   at least one torque interface coupled to both the driveshaft and the at least one continuous loop of the plurality of interlocked bone sculpting tools.

2. The bone void sculpting instrument of claim 1, further comprising:
a plurality of secondary lateral surfaces;
a plurality of continuous loops of interlocked bone sculpting tools; and
a plurality of torque interfaces,
wherein each continuous loop of interlocked bone sculpting tools is matched with a corresponding secondary lateral surface and torque interface.

3. The bone void sculpting instrument of claim 1, comprising no more than fifty secondary lateral surfaces, no more than fifty continuous loops of interlocked bone sculpting tools, and no more than fifty torque interfaces.

4. The bone void sculpting instrument of claim 2, wherein a body is formed from a plurality of segments each comprising:
a primary lateral surface;
a secondary lateral surface; and
an internal tool frame cavity,
wherein the plurality of segments are rigidly connected to one another.

5. The bone void sculpting instrument of claim 1, wherein the drive interface is configured to receive torque in a first direction of rotation and transfer to the torque to the driveshaft in either the first direction of rotation or a second direction of rotation.

6. The bone void sculpting instrument of claim 1, wherein the driveshaft further comprises a central channel between the proximal and distal ends of the driveshaft, configured to allow aspiration or irrigation of the bone cavity.

7. The bone void sculpting instrument of claim 1, wherein each bone sculpting tool has a convex surface and a concave surface, the convex surface configured to contact the bone when the bone sculpting tool is moving along a pre-configured path along the secondary lateral surface in a first direction and the concave surface configured to contact the bone when the bone sculpting tool is moving along a pre-configured path along the secondary lateral surface in a second direction.

8. The bone void sculpting instrument of claim 7, wherein the at least one continuous loop of interlocked bone sculpting tools includes two hundred or less bone sculpting tools.

9. The bone void sculpting instrument of claim 1, wherein each bone sculpting tool of the plurality of interlocked bone sculpting tools is configured to mill bone when the bone sculpting tool is moving along a pre-configured path along the secondary lateral surface in a first direction and compact bone when the bone sculpting tool is moving along a pre-configured path along the secondary lateral surface in a second direction.

10. The bone void sculpting instrument of claim 1, wherein each bone sculpting tool plurality of interlocked bone sculpting tools has a first end and a second end, the first end comprising a substantially spherical protrusion, and the second end comprising a substantially spherical cavity, wherein a continuous loop of interlocked bone sculpting tools is formed by fitting the substantially spherical protrusion of one bone sculpting tool within the substantially spherical cavity of a second bone sculpting tool.

11. The bone void sculpting instrument of claim 1, wherein each bone sculpting tool is configured to move with at least three degrees of freedom relative to neighboring bone sculpting tools when the plurality of interlocked bone sculpting tools is formed into at least one continuous loop of interlocked bone sculpting tools.

12. A system for preparing a femur for total hip arthroplasty comprising:
a bone void sculpting instrument comprising:
a tool frame, comprising:
a primary lateral surface;
at least one secondary lateral surface recessed from the primary lateral surface, wherein the at least one secondary lateral surface has a non-constant radius; and
an internal tool frame cavity;
a driveshaft having a proximal end and a distal end, wherein the driveshaft is rotatably fixed within the internal tool frame cavity;
a drive interface coupled to the proximal end of the driveshaft;
a plurality of bone sculpting tools interlocked to form at least one continuous loop around the at least one secondary lateral surface, the at least one continuous loop of interlocked bone sculpting tools having a substantially same cross-sectional shape as the at least one secondary lateral surface, the at least one continuous loop of interlocked bone sculpting tools configured to move along a pre-configured path along the at least one secondary lateral surface; and
at least one torque interface coupled to both the driveshaft and the at least one continuous loop of interlocked bone sculpting tools; and
an attachment configured to deliver torque to the bone void sculpting instrument, wherein the attachment is rigidly connected to the tool frame of the bone void sculpting instrument and coupled to the drive interface of the bone void sculpting instrument.

13. The system of claim 12, wherein the attachment is a surgical drill.

14. The system of claim 12, wherein the attachment is an end-effector of a surgical robot.

15. The system of claim 12, further comprising a provisional femoral neck prosthetic implant trial.

16. The system of claim 12, further comprising at least one bone void sculpting instrument of a larger size.

17. The system of claim 12, further comprising:
an instrument for performing a femoral neck osteotomy;
an instrument for expanding a femoral canal distally; and
a plurality of retractors.

18. The system of claim 17, wherein the instrument for expanding the femoral canal distally is a flexible reamer.

19. The system of claim 17, further comprising:
a device for opening a top of a femoral canal, the device selected from the group consisting of:
a chisel;
a rasp; and
a broach.

20. A system for total hip arthroplasty comprising:
a bone void sculpting instrument comprising:
a tool frame, comprising:
a primary lateral surface;
at least one secondary lateral surface recessed from the primary lateral surface, wherein the at least one secondary lateral surface has a non-constant radius; and
an internal tool frame cavity;
a driveshaft having a proximal end and a distal end, wherein the driveshaft is rotatably fixed within the internal tool frame cavity;
a drive interface coupled to the proximal end of the driveshaft;
a plurality of bone sculpting tools interlocked to form at least one continuous loop around the at least one secondary lateral surface, the at least one continuous loop of interlocked bone sculpting tools having a substantially same cross-sectional shape as the at least one secondary lateral surface, the at least one continuous loop of interlocked bone sculpting tools configured to move along a pre-configured path along the at least one secondary lateral surface; and at least one torque interface coupled to both the driveshaft and the at least one continuous loop of interlocked bone sculpting tools; and an attachment configured to deliver torque to the bone void sculpting instrument, wherein the attachment is rigidly connected to the tool frame of the bone void sculpting instrument and coupled to the drive interface of the bone void sculpting instrument; and a prosthetic hip implant.

* * * * *